United States Patent [19]

Meier

[11] 3,727,318
[45] Apr. 17, 1973

[54] MICROMETER APPARATUS

[76] Inventor: Johann Meier, Casa Clarissa CH - 6645 Brione Sopra, Minusio, Switzerland

[22] Filed: Oct. 26, 1970

[21] Appl. No.: 83,841

[30] Foreign Application Priority Data

Oct. 27, 1969 Switzerland..................160 78/69

[52] U.S. Cl.......................33/170, 33/164 B, 33/166
[51] Int. Cl................................................G01b 5/00
[58] Field of Search...................33/164 B, 165, 166, 33/167, 170

[56] References Cited

UNITED STATES PATENTS

| | | | |
|---|---|---|---|
| 809,272 | 1/1906 | Starrett | 33/165 |
| 1,516,387 | 11/1924 | Kellerstedt | 33/165 X |
| 3,484,942 | 12/1969 | Toubhans | 33/166 |
| 3,103,827 | 9/1963 | Logan | 33/164 B X |

FOREIGN PATENTS OR APPLICATIONS 521,794    3/1921    France..............................33/164 B Primary Examiner—William D. Martin, Jr.
Attorney—Lawrence E. Laubscher

[57] ABSTRACT

Micrometer apparatus for accurately measuring and indicating distance, including a vernier casing rotatably mounted concentrically about a cylindrical micrometer head, a follower member arranged for coaxial reciprocatory movement relative to said micrometer head, and actuator means connected with said vernier casing for effecting longitudinal displacement of said follower member relative to said micrometer body. The invention is characterized in that the actuator means includes first and second screw thread means of different pitch and thread direction for connecting the vernier casing with the micrometer body and with the follower, respectively.

In accordance with a modification of the invention, the micrometer head is connected with a housing that supports a gauge pin mounted for axial sliding movement in a direction parallel with the actuator axis, a scale plate being carried by said gauge pin. The follower member is operable to displace a reader marker relative to said scale plate to afford a vernier reading of the position of the gauge pin relative to the housing.

4 Claims, 3 Drawing Figures

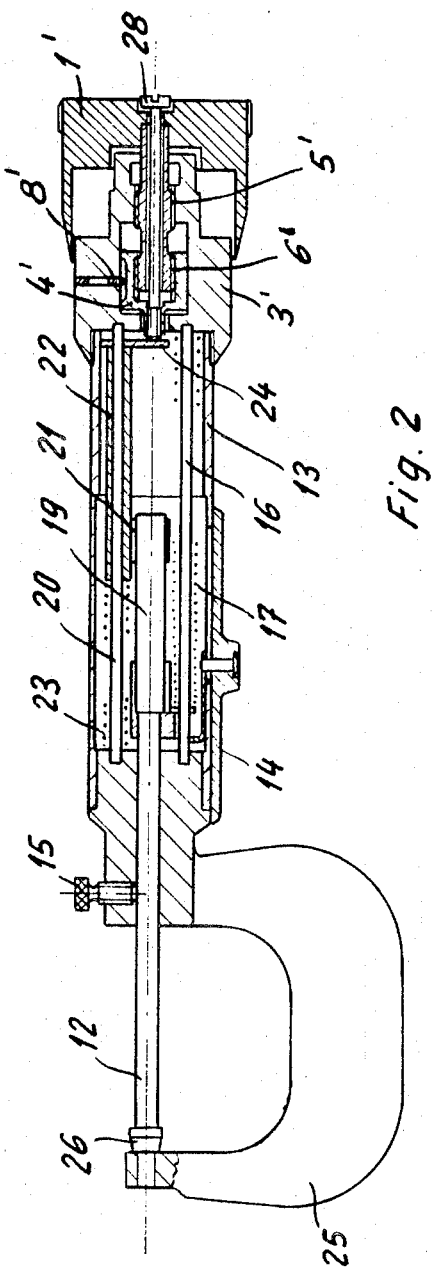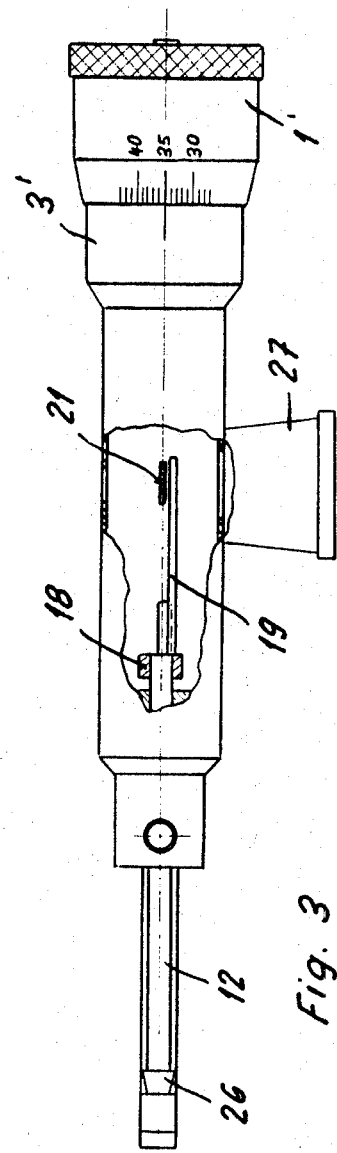

MICROMETER APPARATUS

This invention relates to micrometer apparatus including a micrometer head, a follower connected for reciprocatory non-rotary movement relative to said micrometer head, and actuator means for displacing said follower relative to said micrometer head.

The known micrometers generally afford a reading accuracy of no better than 1/100 mm, because measuring screws with feed threads having a pitch of 0.1 mm cannot be made in practice and because a thread pitch between 0.1 and 1 mm is impractical when it comes to accurately reading a measurement value. A measuring screw thread with a pitch of 1 mm affords a reading accuracy of 1/100 mm when a vernier scale with 100 graduations is used.

It is the primary object of the present invention to provide a micrometer head which will afford a greater reading accuracy than those presently in use, and by means of which it will be possible to achieve very great reading accuracy without the use of measurement screw threads with extremely small pitch.

The micrometer head according to the present invention is characterized by the fact that the actuator means is provided with a first feeder thread that engages the micrometer head body, and a second feeder thread that exhibits a different thread direction and a different pitch, said second screw thread being connected with a follower member arranged for reciprocatory, non-rotational movement relative to the micrometer body, so that when the vernier casing is rotated, the follower will be moved forward only by the pitch difference between the two feeder threads.

It is desirable to develop the operating part as a vernier casing and to provide on this casing a vernier scale that cooperates with a companion scale placed on the micrometer head body.

In order to afford a wide measurement range, it is desirable to have the micrometer head body connected with a micrometer housing or to have it constructed integrally with the latter. It is also desirable to arrange a gauge pin which can be moved longitudinally in the micrometer housing and which is connected with a scale extending in its longitudinal direction adjacent a reading marker that is movable longitudinally of the scale by means of the follower. In this way, it is possible quickly to adjust the gauge pin to a new measurement without the necessity of excessive turning of the operating means.

To read the scale, the micrometer housing is best equipped with a magnifying lens.

The invention is described in greater detail below, reference being made to the accompanying drawing in which:

FIG. 2 is a longitudinal cross-sectional view of a second embodiment provided with a quickly adjustable gauge pin; and FIG. 3 is a top plan view, with certain parts broken away, of the apparatus of FIG. 2.

Figure 1:
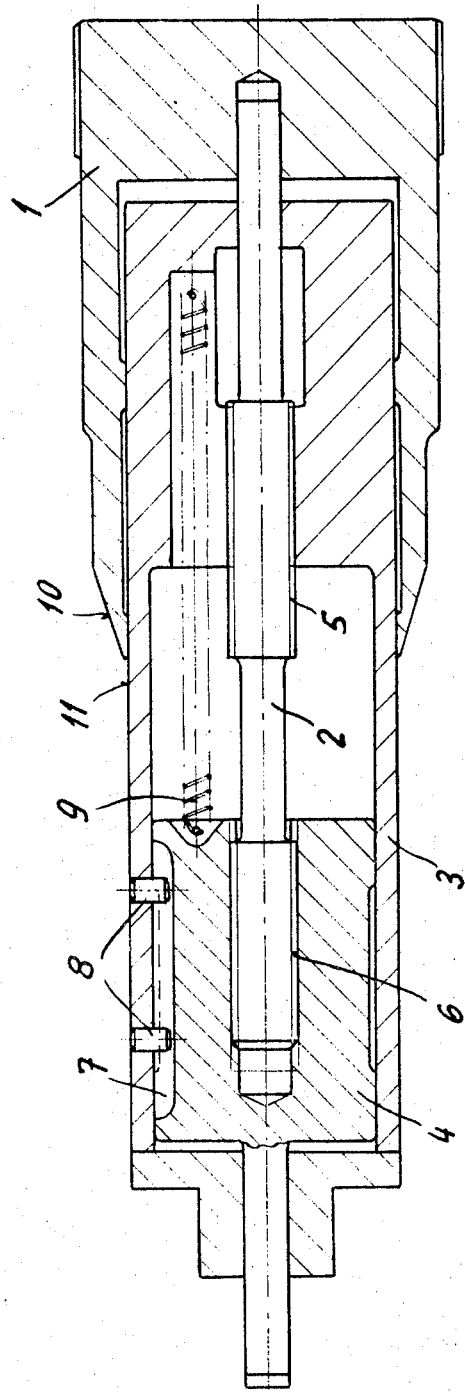
FIG. 1 is a longitudinal view of a first embodiment of the micrometer apparatus of the present invention, said apparatus being suitable for small measurement ranges.

FIG. 1 illustrates a micrometer apparatus that is intended for small measurement ranges (on the order of magnitude of from about 1 mm to about 5 mm). The apparatus is not particularly suitable for wider measurement ranges, since the vernier casing 1 would require too much turning. Such a micrometer apparatus is suitable, for example, for measuring a certain dimension of a mass-produced work piece.

As seen from FIG. 1, the micrometer apparatus includes a vernier casing 1, a spindle 2 rigidly connected with the casing in a non-rotating manner, and a follower 4 that is longitudinally movable relative to the screw in the chamber defined within the micrometer head body 3.

The spindle 2 is provided with a right-hand first feeder thread 5 which engages the micrometer head 3 and which has a pitch of 0.6 mm, and a left-hand second feeder thread 6 which, compared to the first one, reveals a different thread direction and a different pitch (namely, a pitch of 0.5 mm), which second feeder thread engages the follower 4 that is keyed to the micrometer head for longitudinal non-rotational movement relative thereto. For the purpose of guiding the follower 4, the latter is provided with a longitudinal slit 7 in which extend two pins 8 that are fastened in the micrometer head body 3.

As a result of this design, when the vernier casing 1 is moved by one turn, the follower 4 is moved forward only by the pitch difference between the two feeder threads 5 and 6 (that is to say, in the present case, by 0.1 mm). Assuming a very small pitch difference between the two feeder threads 5 and 6, these threads afford very great accuracy because the follower 4 covers only a distance corresponding to this pitch difference for each revolution of the vernier casing 1.

To eliminate the influence of thread play, a tension spring 9 is arranged in micrometer head body 3, which spring biases the follower 4 and the spindle 2 axially against the first feeder thread 5.

The vernier scale 10, which is arranged circumferentially on the vernier casing 1, cooperates, as is generally known, with a scale 11, arranged on the micrometer head body 3. If the vernier scale 10, arranged along the circumference of the vernier casing 1, reveals, for example, 100 graduations or 100 numbers, then the feed of 0.1 mm, which is accomplished for every revolution of the vernier casing 1, is once again subdivided 100 times (that is to say, we can readily read indications of 1/1000 mm).

FIGS. 2 and 3 illustrate a second embodiment of the micrometer designed according to the invention with rapidly adjustable gauge pin 12.

Similar parts have been labeled with the primed reference numerals of FIG. 1.

Since the micrometer head here is intended to have very great reading accuracy, a relatively large number of revolutions of the vernier casing 1 are required in order to displace the follower. More specifically, in the design of the feed screw 2, as in the above described example, ten revolutions of the vernier casing 1 are required in order to advance the follower by 1 mm. To adjust the measurement range of a micrometer by a relatively large amount (for instance, 10 mm), too many revolutions of the vernier casing 1 are required. In other words, it would be impossible to adjust the follower 4 quickly. In order to be able to retain great reading accuracy on the one hand and to facilitate also the rapid adjustability of the measurement follower on the other, such a micrometer can be designed, for example, as illustrated in FIGS. 2 and 3.

As we can see from FIG. 2, the micrometer head body 3' is screw threaded onto the micrometer housing 13. The micrometer includes a vernier casing 1, feeder spindle 2' which engages the casing in a rigid, non-rotating manner, and a follower 4' which can be moved longitudinally over the spindle in the micrometer head body 3'. The feeder threads 5' and 6' on the feeder screw 2' are also arranged and dimensioned as in the example shown in FIG. 1.

For the rapid adjustment of the measurement range, there is arranged, in micrometer housing 13, a gauge pin or rod 12, which can be moved along the longitudinal direction of the housing. This gauge pin can be displaced by means of a finger part 14 that is movable along the outside of the micrometer housing 13, and it can be secured in place by means of a clamping screw 15. In order to move the gauge pin 12 always into the starting position, there is arranged, on the lower longitudinal guide 16 which extends in the interior of the housing, a compression spring 17 which presses on a guide part 18 that is arranged at the end of the gauge pin 12. The guide part 18 engages the longitudinal guide 16 and prevents the graduated scale 19, which is at the end of the gauge pin 12, from rotating with respect to the longitudinal access of the housing.

On an upper second longitudinal guide 20 arranged within the housing, there is mounted a reading marker 21 that is movable longitudinally of the scale 19, which marker is connected with the guide casing 22 for movement by the follower 4'. On the longitudinal guide 20 there is further arranged a compression spring 23 which biases the guide casing 22 (connected with a stud 24, in FIG. 2) toward the right against the follower 4'.

If a work piece is to be measured, then, by means of the finger part 14, the gauge pin 12 is displaced a sufficient distance to the right from the stop face 26 arranged on yoke 25. The work piece to be measured is placed between the stop face 26 and the gauge pin 12, whereupon the gauge pin is released and fixed in the measurement position by the clamping screw 15. Then the reading marker 21 is moved to coincide with the next-lower graduation on the graduated scale 19 by turning the vernier casing 1' in the known manner, whereupon a value on the vernier casing 1' is read which is between two graduation division marks. The division marks on the graduated scale 19 are, for example, 1/10 mm apart from each other. This interval corresponds to the feed of the follower 4' in case of one revolution of the vernier casing 1'. The vernier scale 10', which is arranged along the circumference of the casing 1', indicates 100 graduation division marks, which means that we can read off 1/1,000 mm on the vernier scale 10'.

For inspecting the relative adjustment of the reading marker 21 and the graduated scale 19, there is provided a 20 power magnifying lens, so that this should not cause any difficulties.

For the exact zero adjustment, there is arranged in the micrometer head a zero point adjustment screw 28 by means of which the zero point can be adjusted at any time.

We can see that even greater reading accuracy can be achieved through the corresponding selection of the pitch of the two feeder threads 5' and 6'.

While in accordance with the provisions of the Patent Statutes the preferred form and embodiments of the invention have been illustrated and described, it is apparent that various modifications may be made in the apparatus described.

What is claimed is:

1. Micrometer apparatus, comprising
    a. a cylindrical vernier casing (1') containing at one end a longitudinal bore;
    b. a cylindrical micrometer head (3') arranged concentrically at one end within said bore, said head containing therein a longitudinal chamber;
    c. a follower member (4') arranged for reciprocatory non-rotational movement in said micrometer head chamber;
    d. actuator means for axially displacing said follower member relative to said head, said actuator means comprising an actuator member (2') non-rotatably connected at one end with said casing and extending coaxially through aligned central openings contained in said micrometer head and said follower member, respectively, and first (5') and second (6') screw thread means threadably connecting said actuator member with said micrometer head and with said follower member, respectively, said first and second screw thread means having different thread pitches and different thread directions, whereby upon rotation of said casing relative to said micrometer head, the follower member is longitudinally displaced a distance that is a function of the pitch difference between the threads of said first and second screw thread means;
    e. a tubular housing (13) connected at one end with and extending coaxially from the other end of said micrometer head;
    f. a gauge rod (12) mounted for axial sliding movement in the other end of said tubular housing;
    g. a scale plate (19) connected with that end of said gauge rod that extends within said housing;
    h. a reading marker (21) arranged for longitudinal movement within said housing adjacent said scale plate;
    i. means (22) operable by said follower member for displacing said marker relative to said scale plate; and
    j. finger-operated means (14) arranged externally of the micrometer housing (13) for axially displacing said gauge rod relative thereto.

2. Apparatus as defined in claim 1, and further including spring means (17) biasing said gauge pin outwardly relative to said micrometer housing.

3. Apparatus as defined in claim 1, and further including spring means (23) biasing said reading marker in the direction of said follower member.

4. Micrometer apparatus, comprising
    a. a micrometer housing (13) containing a longitudinal chamber;
    b. a gauge rod (12) connected with one end of said housing for longitudinal reciprocatory movement relative thereto, said rod extending at one end within said chamber;
    c. a scale plate (19) connected with the end of said gauge rod within said chamber;

d. a reading marker (21) connected for longitudinal movement within said housing adjacent and independent of said scale plate; and
e. means for longitudinally displacing said reading marker relative to said housing, including
  1. a micrometer head (6') connected at one end with the other end of said housing, said head containing a chamber generally colinear with said housing chamber;
  2. a follower (4') mounted for longitudinal movement within said micrometer head chamber;
  3. means (22, 24) connecting said follower member with said reading marker; and
  4. actuator means for axially displacing said follower member relative to said micrometer head, comprising
    a. a vernier casing (1') containing at one end a bore for rotatably receiving the other end of said micrometer housing;
    b. an actuator member (2') non-rotatably connected at one end with said casing and extending coaxially through aligned central openings contained in said micrometer head and said follower member, respectively; and
    c. first (5') and second (6') screw thread means threadably connecting said actuator member with said micrometer head and with said follower member, respectively, said first and second screw thread means having different thread pitches and different thread directions, whereby upon rotation of said casing relative to said micrometer head, the follower member is longitudinally displaced a distance that is a function of the pitch difference between the threads of said first and second screw thread means.

* * * * *